United States Patent [19]  
Devault et al.

[11] Patent Number: 4,566,095  
[45] Date of Patent: Jan. 21, 1986

[54] TIME DIVISION MULTIPLEX SWITCHING NETWORK PERMITTING COMMUNICATIONS BETWEEN ONE OR SEVERAL CALLING PARTIES AND ONE OR SEVERAL CALLED PARTIES

[76] Inventors: Michel Devault, 22, rue de Bourgogne, 22300 Lannion; Bernard Gérard, 24, Cite des Lauriers, Ker-Maria-Sulard, 22450 La Roche-Derrien; Yvon Rouaud, Les Fontaines, A33, 22300 Lannion, all of France

[21] Appl. No.: 566,433

[22] Filed: Dec. 28, 1983

[30] Foreign Application Priority Data

Dec. 30, 1982 [FR] France ............................ 82 22122

[51] Int. Cl.⁴ ............................................ H04Q 11/04
[52] U.S. Cl. ......................................... 370/60; 370/94
[58] Field of Search ................. 370/60, 94, 91, 62, 370/92

[56] References Cited  
U.S. PATENT DOCUMENTS 4,258,434  3/1981  Glowinski ........................ 370/60
4,354,263 10/1982  Bordry et al. .................... 370/60
4,380,063  4/1983  Janson et al. .................... 370/60
4,446,555  5/1984  Devault et al. ................... 370/94
4,477,899 10/1984  Kato et al. ....................... 370/60

FOREIGN PATENT DOCUMENTS 2500704  2/1981  France .

Primary Examiner—Douglas W. Olms  
Assistant Examiner—Kenneth I. Rokoff  
Attorney, Agent, or Firm—Lowe, King, Price & Becker

[57] ABSTRACT

An asynchronous time division multiplex switching network for switching multi-service communication data performs point-to-point data switching, data switching between a single calling party and a plurality of called parties, and data switching between plural calling parties and a single called party. The network comprises plural incoming and outgoing time division multiplex highways including asynchronous channels each formed by a packet data and an address label (j, k). Incoming and outgoing terminal switching equipments are respectively connected to the incoming and outgoing highways. A bus interconnects the terminal switching equipments. The labels are converted into several sub-words according to the type of communication switching. In response to the values of these sub-words, the outgoing terminal switching equipments accept or do not accept the packets to be transmitted.

2 Claims, 14 Drawing Figures

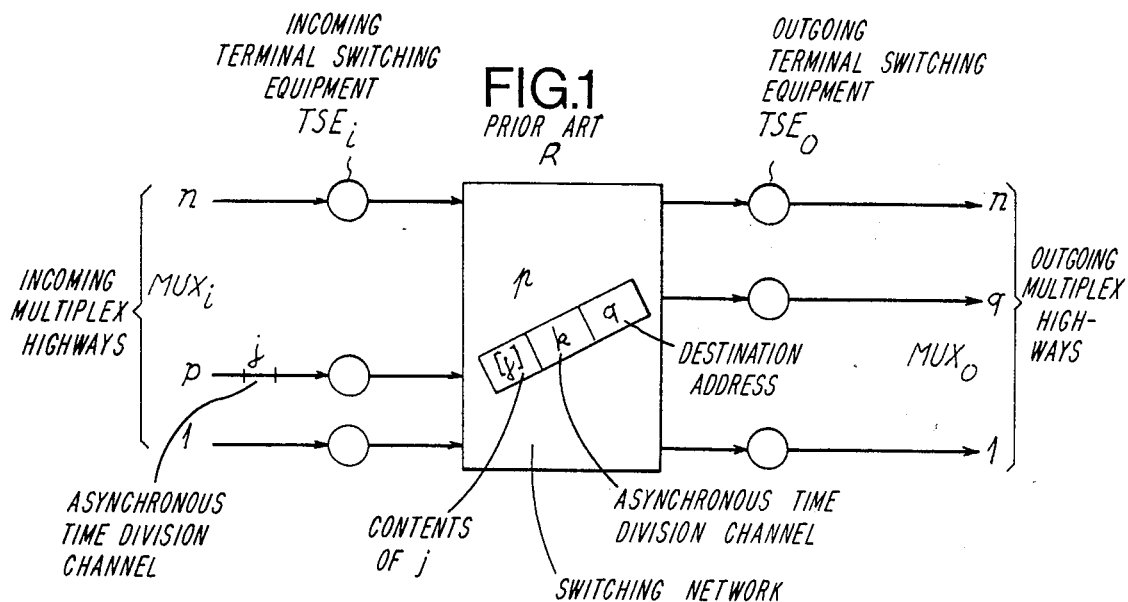
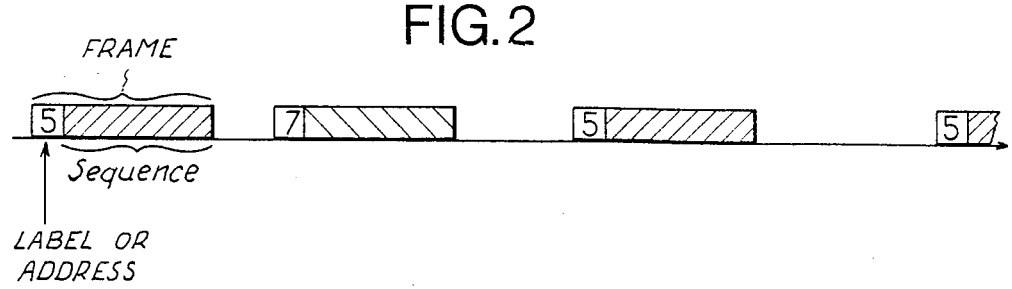
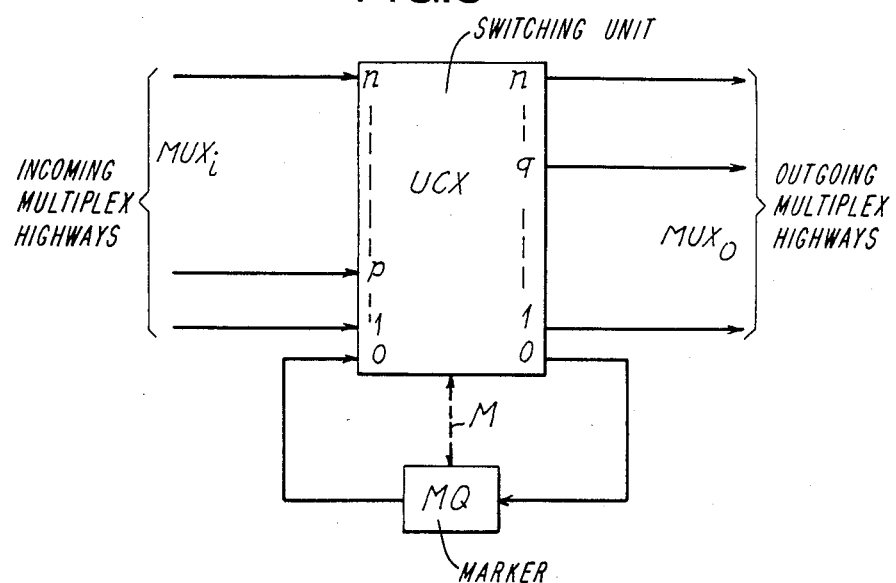

INPUT TERMINAL EQUIPMENT $TSE_{ip}$

INPUT SWITCHING EQUIPMENT $TSE_{ip}$

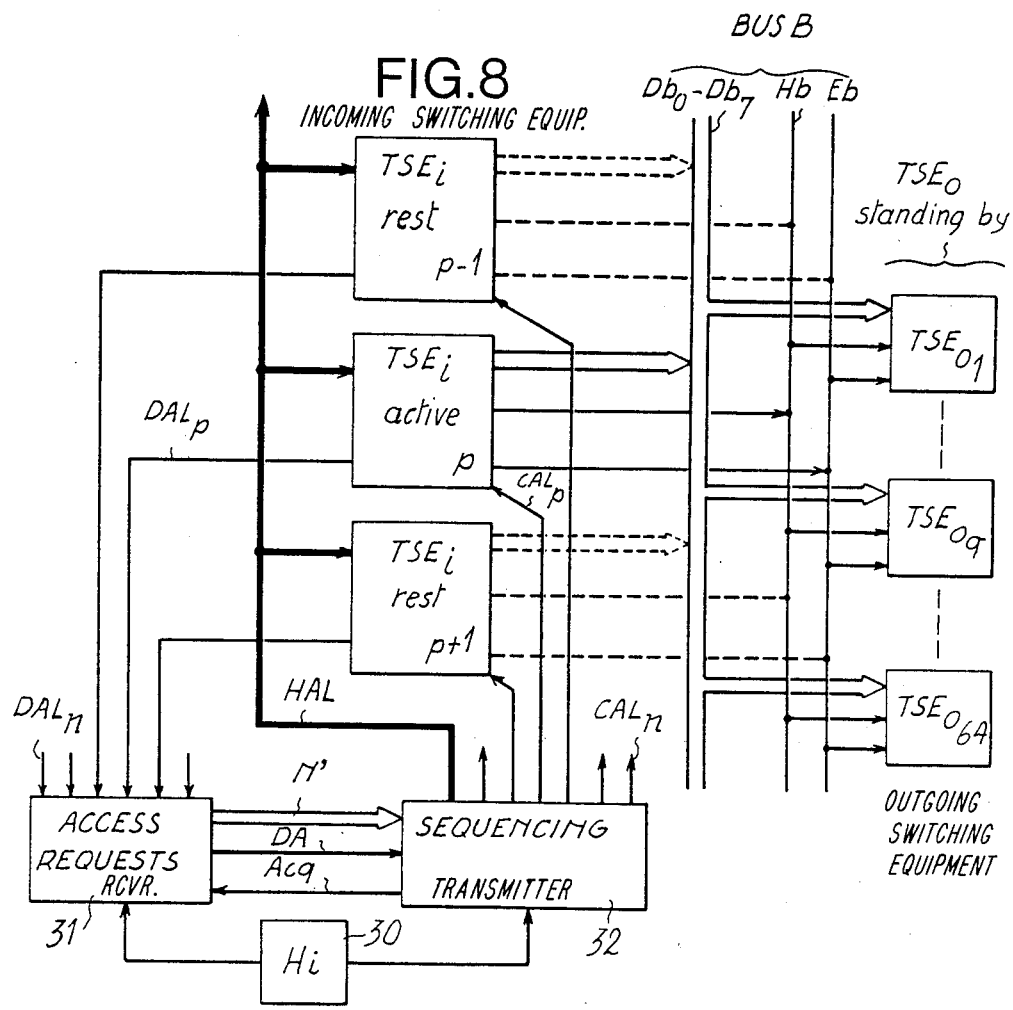
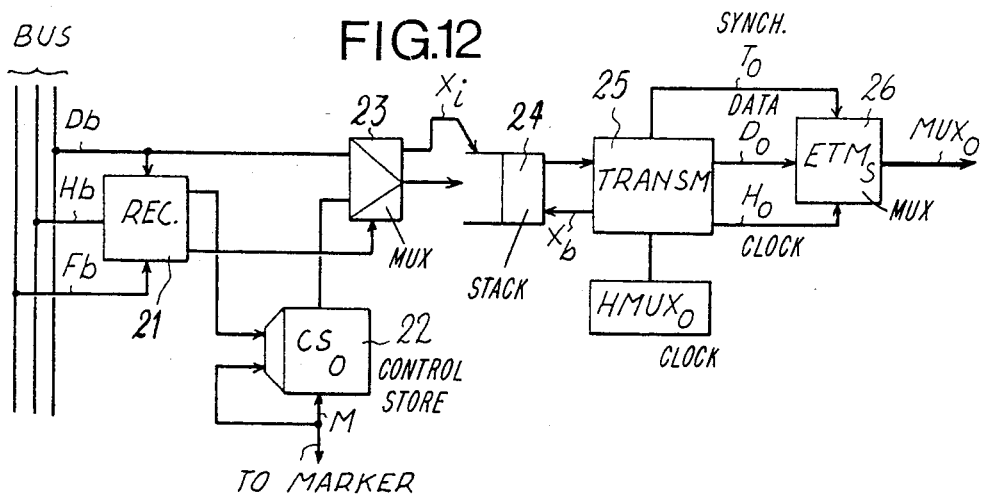

TIME DIVISION MULTIPLEX SWITCHING NETWORK PERMITTING COMMUNICATIONS BETWEEN ONE OR SEVERAL CALLING PARTIES AND ONE OR SEVERAL CALLED PARTIES

BACKGROUND OF THE INVENTION

1. Field of the Invention

The present invention relates to an asynchronous time division multiplex switching network for switching digital communication data, particularly multi-rate communication data, pertaining to different communication services such as telephone, data transmission, visiophony, CATV and the like.

2. Description of the Prior Art

The theory behind asynchronous time division multiplex switching systems has been considered for a switching system integrating digital telephone and communication data and defining circuit and packet hybrid frames (see FR-A-2500704 of Feb. 20, 1981). This switching system consists of terminal switching equipments (TSEs), connected on the one hand to time division multiplex highways, and on the other hand to a switching network.

FIG. 1 is a block diagram of a prior art uni-directional representation having the separate inputs i and outputs o. To switch the contents [j] of the incoming asynchronous time division channel (j) in the incoming multiplex highways $MUX_{ip}$ to the outgoing asynchronous time division channel (k) in the outgoing multiplex highway $MUX_{oq}$, the terminal switching equipment $TSE_{ip}$ forms a packet (P) comprising contents [j] to which the destination address (q, k) is added and then enters this complemental packet in the switching network (R). With the help of this address, the switching network orients the packet toward terminal switching equipment $TSE_{oq}$. Terminal switching equipment $TSE_{oq}$ inserts contents [j] into the channel (k) of outgoing multiplex highway $MUX_{oq}$.

The address (q, k) is supplied by a control memory local to the terminal switching equipment $TSE_{ip}$ and addressed by channel (j). This memory is thus input controlled. The input control memories are economical memory-wise in capacity as seen hereafter and well suited to point-to-point connections of the type defined by $$pj \rightarrow qk$$

and to concentration communications in which a plurality of calling parties pj, p'j', p"j" require connection to a single called party qk $$pj, p'j', p"j" \rightarrow qk$$

On the other hand, the control store CS may be controlled by the output. In this case, the $TSE_{ip}$ adds to channel (j) the number p of the incoming multiplex highway to form a set of addresses or labels (pj) which is sent to all the terminal switching equipments $TSE_0$. Each terminal switching equipment $TSE_0$, for example terminal switching equipment $TSE_{oq}$, reads its local control store CS at address (pj) where the address k of the outgoing asynchronous channel is stored. This mode of control of the control store is well suited for diffusion communications, that is for connections of the type in which a single calling party pj requires connection to a plurality of called parties qk, q'k', q"k", i.e., $$pj \rightarrow qk, q'k', q"k";$$

however, in return, this control mode is very expensive in memory unit capacity as described hereafter.

SUMMARY OF THE INVENTION

The object of the invention is to provide a time division multiplex switching network which is also well suited for concentration, diffusion and point-to-point communication switching and is nevertheless economical in memory, capacity-wise.

Generally speaking, the switching network of the invention is common to all the incoming terminal switching equipments $TSE_i$ and the outgoing terminal switching equipments $TSE_o$ which permit each incoming equipment $TSE_i$ to diffuse all the packets it receives to all the outgoing equipments $TSE_o$.

More precisely, the address j of the incoming asynchronous channel is replaced in the incoming equipment $TSE_i$ by an indication word intended to be decoded in the outgoing equipments $TSE_o$s and which is composed of three sub-words, a first sub-word characterizing the kind of the communication switching, viz: point-to-point, concentration, diffusion; a second sub-word which either designates the number q of the outgoing multiplex highway or is without significance depending upon the value of the first sub-word; and a third sub-word characterizing the number k of the outgoing asynchronous channel or the number of several outgoing asynchronous channels k', k" in the case of a diffuse communication.

According to the values of the three sub-words which form the identification word, the outgoing equipments $TSE_o$s accept or do not accept the packets.

If the first sub-word indicates a point-to-point or concentration communication, the control store is controlled by one of the incoming equipments $TSE_1$; the second and third sub-words are then respectively q and k and only concern the terminal switching equipment $TSE_{oq}$.

If the first sub-word indicates a diffuse communication, the control store is controlled by one of the outgoing equipments $TSE_o$. The outgoing equipments $TSE_o$s are then unaware of or overlook the second sub-word but, however, utilize the third sub-word for addressing the control store thereof which furnishes the number of the outgoing asynchronous channel.

BRIEF DESCRIPTION OF THE DRAWINGS

The invention will now be described in detail in relation to the accompanying drawings in which:

FIG. 1 is a schematic drawing of an asynchronous time division switching network according to the prior art, discussed in the description of the prior art;

FIG. 2 is a drawing helpful in describing the theory behind an asynchronous time division multiplex switching network;

FIG. 3 is a circuit diagram of the overall architecture of the switching system according to the invention;

FIG. 8 is a functional diagram of the bus allocator;

FIG. 12 is a diagram helpful to outline the $TSE_o$ theory; and

DESCRIPTION OF THE PREFERRED EMBODIMENTS

I. ASYNCHRONOUS SWITCHING SYSTEM THEORY

I.1 Asynchronous time division multiplexing (FIG. 2)

Asynchronous time division multiplexing involves interlacing frames while said frames are composed of an "information sequence" and an address or label.

The frames, sequences and labels have set lengths, such as 1024, 1016 and 8 bits, respectively.

A sequence is a series of bits of an asynchronous time division channel (AC) locally located in the multiplex by the label. In FIG. 2 are illustrated three sequences in AC No. 5 and a sequence in AC No. 7.

Since the label is conveyed with the sequence, there is no longer a need for a periodic time pattern or arrangement to identify an AC. This means that the bit-rate is simply proportional to the average number of frames per unit time and that it can therefore take any value.

By way of an example, with 1016-bit sequences, the bit-rate can be:

2400 bit/s≃for 2.4 frames per second

64 Kbit/s≃for 64 frames per second

100 Kbit/s≃for 100,000 frames per second

An example of bit synchronization and frame synchronization is given infra in connection with the TSE description (see paragraph II 22a).

I.2 Switching system functional lay-out

The role of the switching network is to make, hold and then break connections between incoming and outgoing asynchronous channels AC included in the multiplex highways.

In the switching system, the connection between $AC_j$ in an incoming multiplex highway $p(MUX_{ip})$ and $AC_k$ in an outgoing multiplex highway $q(MUX_{oq})$ involves causing all the frames having j as a label received on $MUX_{ip}$ to be emitted on $MUX_{oq}$, after j is changed to k.

The switching system is made up of two sub-systems:

a switching unit UCX that is connected to the incoming and outgoing multiplex highways, respectively, $MUX_{i0}$ to $MUX_{in}$ and $MUX_{o0}$ to $MUX_{on}$. The switching unit UCX includes multiplexer and dumultiplexer circuits.

a marker MQ that controls make and break connections inside UCX and for this purpose is connected to:
*UCX through a specific marking access M;
*$MUX_{i0}$ and $MUX_{o0}$ for connection order exchanges.

Figure 4:
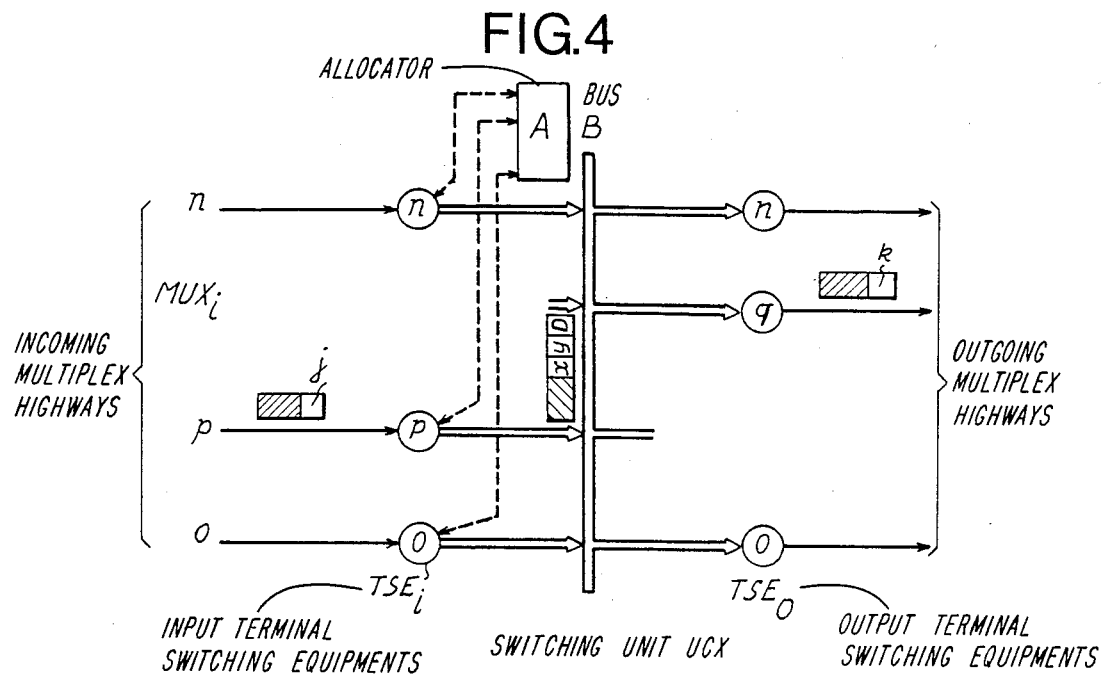
FIG. 4 is a block diagram of the structure of the switching unit.

I.3 Switching unit UCS (FIG. 4)

Unit UCS includes terminal switching equipments (TSE) interlinked via a bus B that constitutes the switching network proper and to which the multiplex highways are linked.

Frame switching in unit UCX can be achieved by one of two methods: output or input control.

Output control: For each incoming frame, the particular input switching equipment $TSE_i$ adds the number p of the particular multiplex highway $MUX_i$ conveying the frame to the number j of the connection AC and then emits through the bus B the composite address jp thus formed. This composite address jp is then decoded by all the $TSE_{o0}$-$TSE_{on}$ for recognizing the frames which concern the said $TSE_o$. To this end, there is provided in each outgoing terminal switching equipment $TSE_{o0}$-$TSE_{on}$ a control store $CS_{o0}$-$CS_{on}$ which, for each value of jp, indicates whether or not the frame is to be accepted by the particular $TSE_{oq}$; control store $CS_{oq}$ signals the number k of the outgoing asynchronous channel.

This lay-out is highly suited to diffusion communications since several of the outgoing terminal switching equipments can accept the same packet; however, it is costly memory-wise: if the UCX connects n MUX of N AC, then each $CS_o$ has a capacity for nN words of $\log_2 N$ bits, i.e., a total of $n^2 N \log_2 N$ bits; in other words, the total capacity is proportional to the square of the number of multiplex highways; when n=64 and N=256, this gives 8,388,608 bits.

Input control: For each incoming frame, the $TSE_i$'s replace j by the overall number kq of the outgoing asynchronous channel as a result of the action of a control store $CS_i$. The $TSE_i$'s then transmit the packet along the bus B and said packet will be accepted only by $TSE_o$ No. q.

This switching method requires only N words of $\log_2 Nn$ bits per $CS_i$, i.e., $nN \log_2 Nn$ bits for the UCX, or in other words, a capacity simply proportional to the number of multiplex highways, i.e., 229,376 bits when n=64 and N=256. On the other hand, it is suitable for concentrated communications.

A joint control mode controls the storage devices used in the present invention; there is partly an input control mode and an output control mode. This permits diffusion connections to be established while restricting the store capacity to about 400,000 bits for n=64 and N=256.

I.31 The bus B:

The rate of bus B equals the product of the rate of the incoming multiplex highways $MUX_i$ and the load rate thereof. In other words, the bus B concentrates the incoming flow rates.

Figure 5:
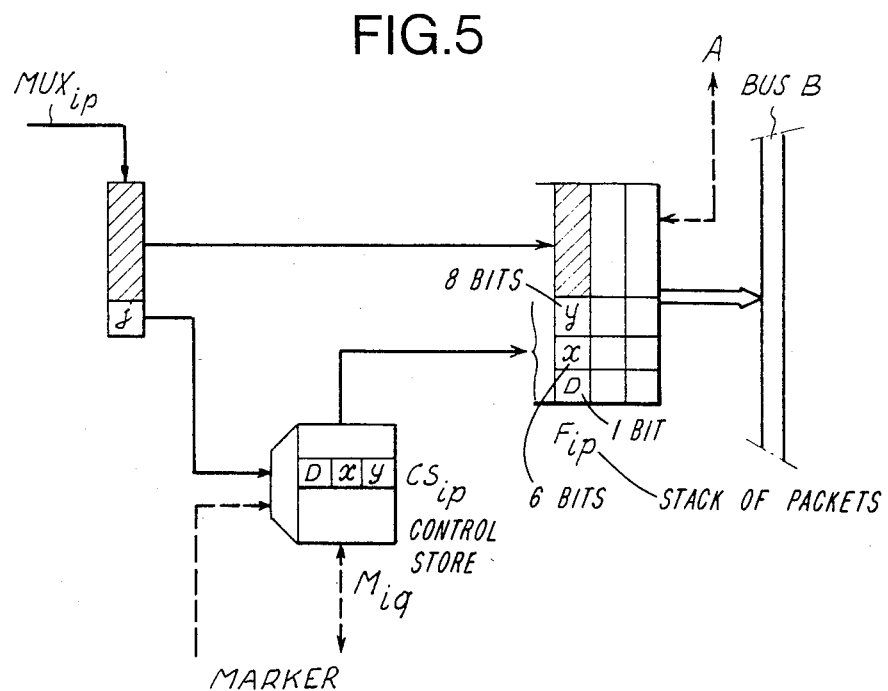
FIG. 5 is a functional lay-out drawing of the input terminal switching equipment $TSE_i$.

I.32 The input terminal switching equipments $TSE_i$ (for instance, $TSE_{ip}$, FIG. 5):

Each $TSE_i$ achieves the following functions:

series reception of the information frames at the instantaneous rate of the associated multiplex highways which convey these frames;

conversion of the 8 bit label j into an identification word of 15 bits performed by control store $CS_i$; this 15 bit identification word includes one bit D, 6 bits x and 8 bits y.

The bit D indicates the type of the communication. If D=0, there is a point-to-point communication pj→qk or a concentration communication pj, p'j', p"j"→qk Then
x=q number of $MUX_o$, q ∈ [0.630] and
y=k number of the outgoing CA, k ∈ [0.2550].
When D=1, there is diffuse communication:

pj→qk, q'k', q"k"

x has no significance;
y=α.

In the case of a diffuse communication, the quantity α is the address of a word having the same address smaller in all or several control stores $CS_{o0}$ so channel $AC_{pj}$ is to be connected to the asynchronous word of locations $AC_{qk}$, $AC_{q'k'}$, $AC_{q"k"}$ the word address in:
α in $CS_{oq}$ is k
α in $CS_{oq'}$ is k'
α in $CS_{oq"}$ is K"

Queueing in $F_{ip}$. This stack $F_{ip}$ is intended for:
*waiting for bus B to become available;
*performing bit-rate change between $MUX_i$ and B.

With authorization from the allocator A (FIG. 4) bus B transmits the packet (sequence+identification number) lying at the bottom of the stack.

Figure 6A:
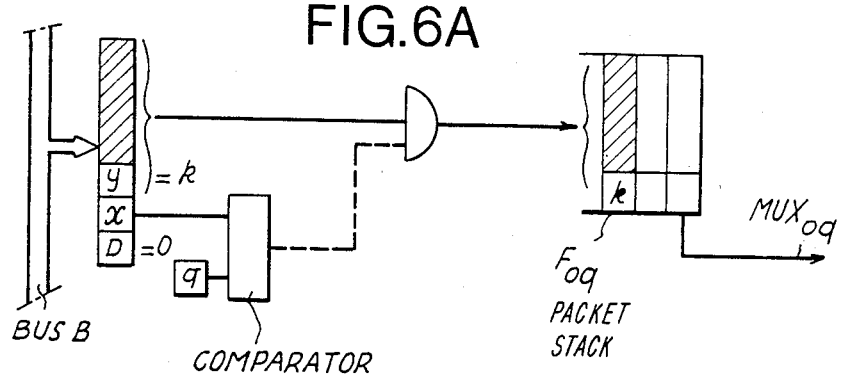
FIGS. 6A and 6B together are block diagrams of the lay-out of the output terminal switching equipment $TSE_o$.
Figure 6B:
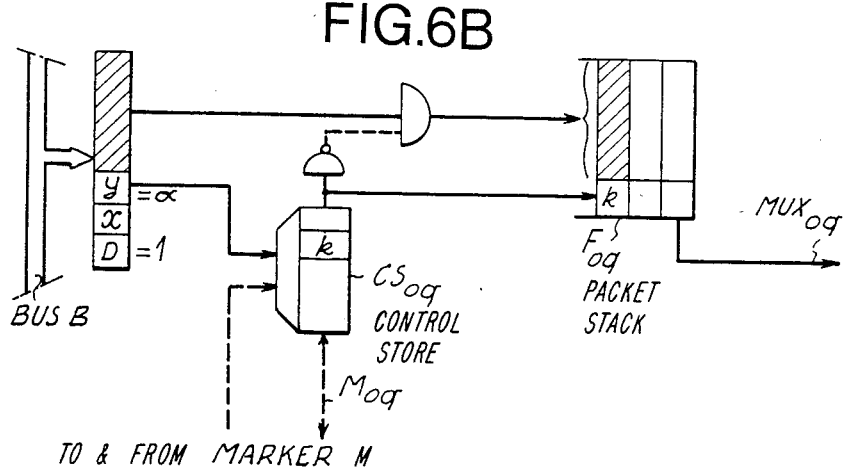

I.33 Outgoing terminal equipments (Example $TSE_{oq}$ in FIGS. 6A and 6B):

These equipment items analyze the identification numbers of all packets transmitted on the bus B in order to single out those packets that must be directed toward the associated $MUX_o$:
if D=0 (FIG. 6A), a comparison is made between the variable x and the number q;
if x=q, the sequence label y=k is stored in the stack $F_{oq}$;
if D=1 (FIG. 6B), y addresses the control store $CS_{oq}$:
*$CS_{oq}$ supplies the number k of the outgoing asynchronous channel and authorizes storage in stack $F_{oq}$ if a connection exists;
*$CS_{oq}$ supplies a specific code (e.g., 1111 1111) that prevents access to $F_{oq}$ if no connection exists.

Equipment $TSE_{oq}$ transmits in series along $MUX_{oq}$ the frame lying at the bottom of stack $F_{oq}$. Stack $F_{oq}$ brings about an instantaneous bit-rate change between bus B and highway $MUX_{oq}$ and stores any series of frames that arrives virtually instantaneously from several of the incoming highways $MUX_j$.

I.34 Memory capacity:

Every $CS_i$ and $CS_o$ respectively has a capacity of 256×15 bits and 256×8 bits, i.e., a total of 256 (15+8)×64=376,832 bits for a switching system carrying 64 multiplex highways each having 256 asynchronous channels.

I.4 Marker MQ

Marker MQ is a processor that makes or breaks connections by "marking" the control stores $CS_i$ and $CS_o$ in accordance with connection orders that the marker receives via $MUX_{io}$ and that it acknowledges via $MUX_{o0}$. The operation of marker MQ is as follows:
(a) point-to-point connection (e.g., pj→qk)
Marker MO writes:
O, q, k at address j in control memory $CS_{ip}$.
(b) concentration connection (e.g., pj, p'j', p"j"→qk)
MQ writes, via links $M_{ip}$, $M_{ip'}$, $M_{ip"}$:
O, q, k at address j in $CS_{ip}$
O, q, k at address j' in $CS_{ip'}$
O, q, k at address j" in $CS_{ip"}$
(c) diffusion connection (e.g., pj→qk, q'k', q"k")

MQ writes, via link $M_{ip}$:
α at address j in $CS_{ip}$
and MQ writes via links $M_{oq}$, $M_{oq'}$, $M_{oq"}$:
k at address α in $CS_{oq}$
k' at address α in $CS_{oq'}$
k" at address α in $CS_{oq"}$ To break the connections, MQ deletes by writing "FF hexadecimal" in the corresponding words of the control store or stores.

II. DESCRIPTION OF SWITCHING UNIT UCX

Figure 7:
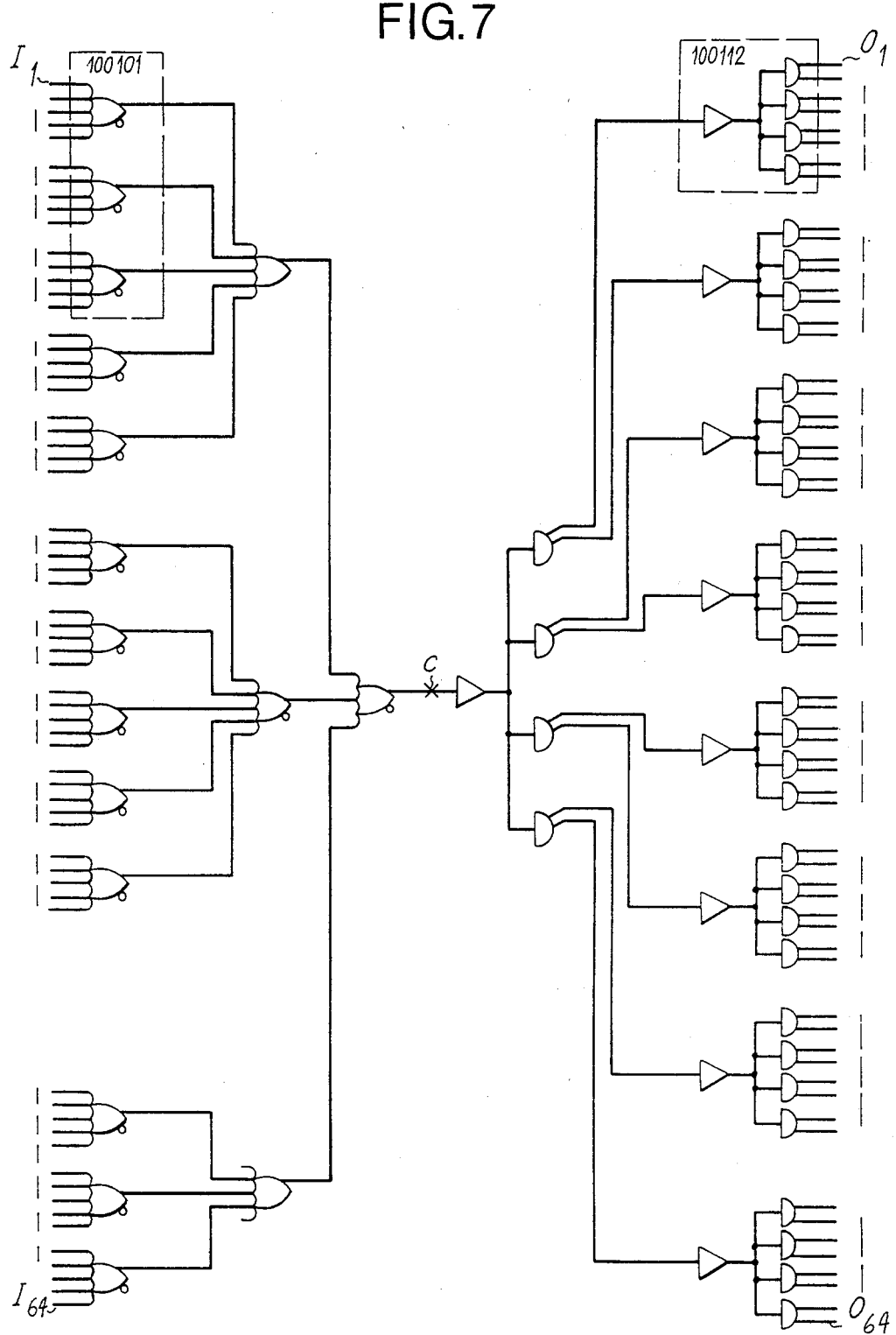
FIG. 7 is a block diagram of a bus in a system incorporating the invention.

II.1 Bus (FIG. 7)

II.11 Theory

The bus B conveys the packets from the incoming switching equipments $TSE_i$ to all of the outgoing switching equipments $TSE_o$.

All the receiver equipment items permanently monitor the bus B and at any moment in time, only one transmitter equipment is active. The other transmitter equipments assume an inactive logic state for the logic OR function.

II.12 Detailed description

The total bit-rate of 1.3 Gb/s is carried by 8 lines of 165 Mbit/s each working in parallel.

The bus B comprises a line for the sampling clock and a line for the end-of-packet signal Fb.

Each of the 10 lines in this bundle is a "twinned" type structure with 64 inputs and 64 outputs (see FIG. 7) comprising 7 100 101 type circuits fulfilling the logic OR function as far as a central point C so that 9 100 112 type circuits achieve a diffusion towards the outputs.

To enable only one $TSE_i$ to transmit at a time, a centralized allocator solves access conflicts. The allocator (FIG. 8) comprises a receiver 31 and a sequencing transmitter 32. Receiver 31 accesses requests emanating from various input switching equipments $TSE_i$ that capture the requests and select one of them by cyclic scanning. Sequencing transmitter 32 receives the "current request" DA information and the number N' of the $TSE_i$ selected from the receiver 31, transmits the right-to-transmit CAL to the $TSE_{iN'}$ releases the request to the receiver, thereby authorizing search and possible selection of another access request, and continuously transmits the base clock HAL to all the $TSE_i$ for transmission on the bus B.

Figure 9:
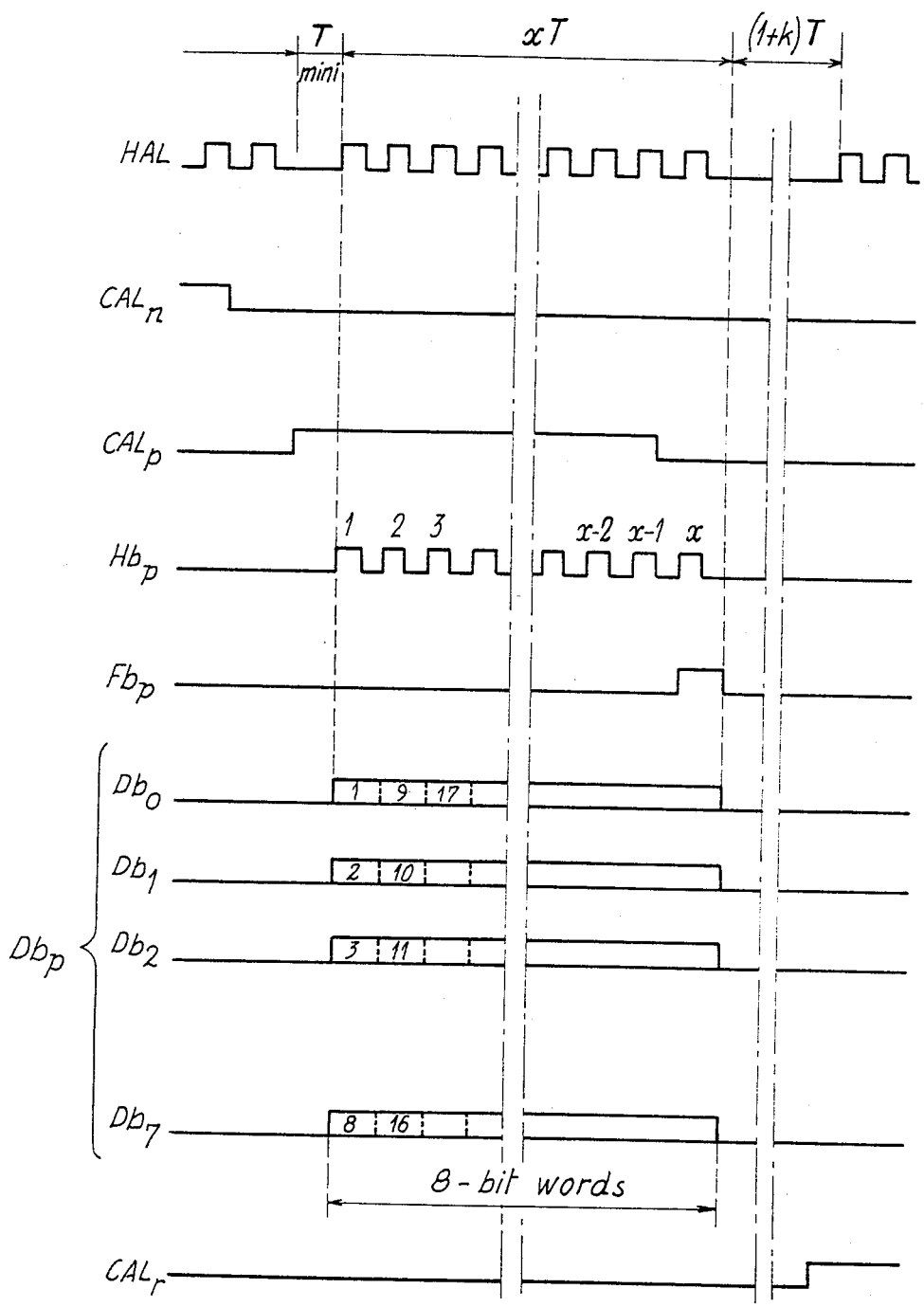
FIG. 9 are illustrations of the wave forms of the bus-related signals.

These various signals are reflected in the timing diagram in FIG. 9.

A time interval of at least one period of clock HAL is maintained between two sequences of this clock to account for the variable transmit times of the bits along the bus; the transmit times depend on the connection positions of the $TSE_i$ and $TSE_o$ to the bus.

An internal clock 30 supplies circuits 31 and 32 with clock signal Hi.

II.2 Input Terminal Switching Equipment: $TSE_i$

II.21 Functional Organization

The input $TSE_{ip}$ receives from an associated asynchronous multiplex highway $MUX_{ip}$ serial frames having labels or addresses pj and transmits over the bus B 15-bit parallel words formed of three sub-words D, x, y.

The input $TSE_i$ (FIG. 10) includes multiplex highway terminal equipment 11 for separating the signals conveyed by the $TSE_i$, namely the information data in the sequence (Di), the sampling clock (Hi) and the frame synchronization signals (Si).

The input terminal switching equipment $TSE_{ip}$ also comprises a control store 12 with a capacity for 256 15-bit words for the conversion:

$$pj \rightarrow D, x, y$$

This control store 12 includes a marker access device and a circuit 13 for performing a series to parallel conversion of the incoming data. Circuit 13 also multiplexes sub-words D, x, y to form the identification number and circuit 13 feeds the sequence and identification number into waiting stack 14. Waiting stack 14 is capable of storing 32-bit words to match the bit-rate in the $TSE_i$ and the bus B. The stack 14 can store 32 words of 32 bits which represent a frame of 1024 bits.

A packet sent on bus 15 causes bus access requests (DAL) to be sent to the allocator, and causes the bit rhythm (HAL) and the right to transmit (CAL) to be received in return; a packet on bus 15 also causes signals to be transmitted in synchronism over the bus: Data Db, Clock Hb and End of packet Fb.

Figure 10:
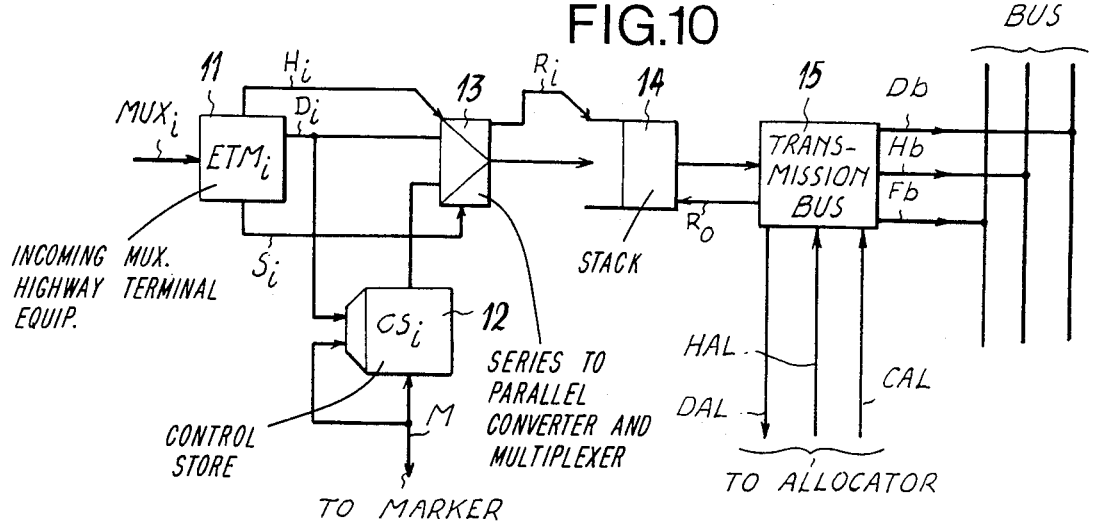
FIG. 10 is a diagram helpful to outline the $TSE_i$ theory.
Figure 11:
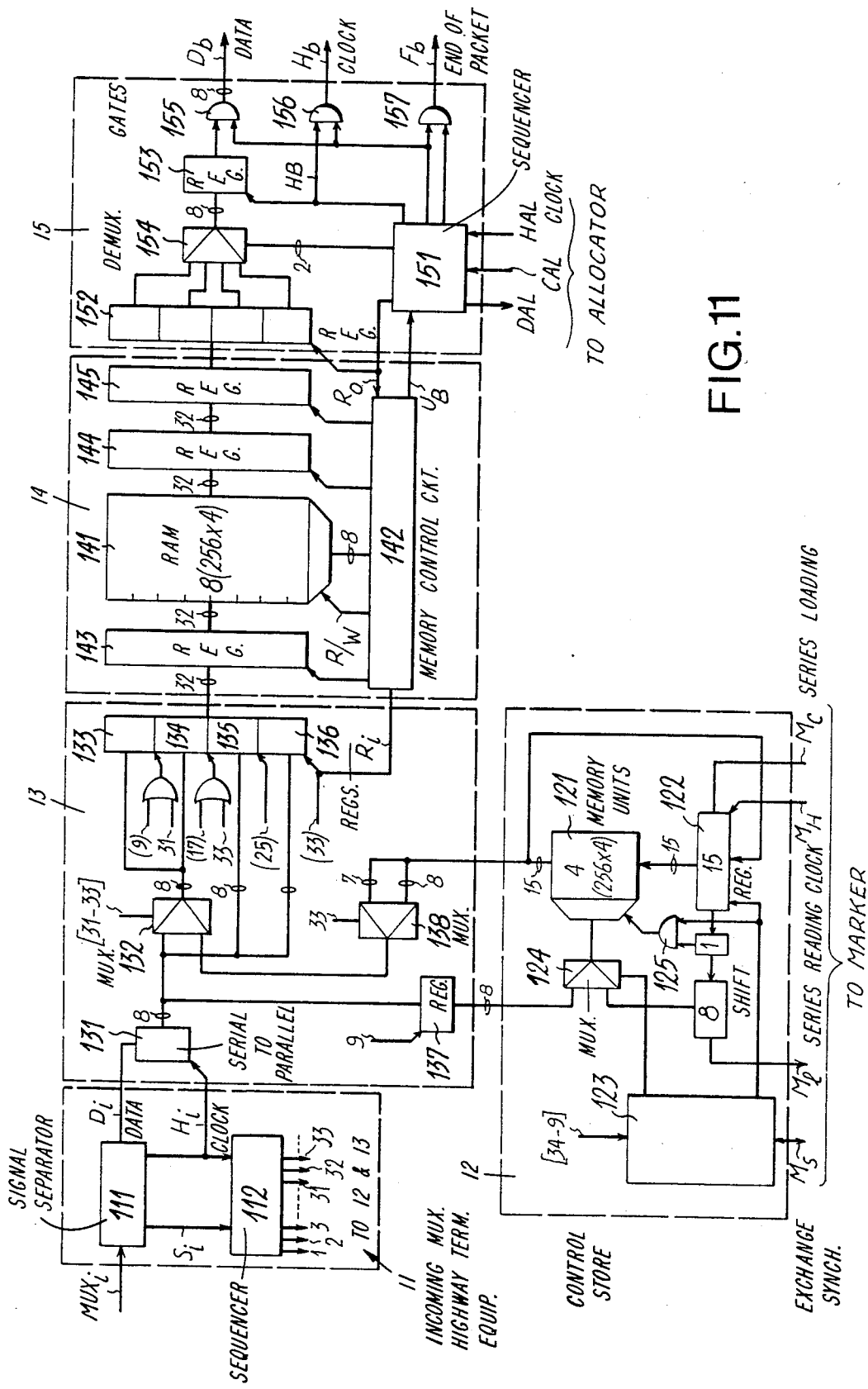
FIG. 11 is a block diagram of the entire incoming terminal switching equipment $TSE_i$ structure.

II.22 Detailed Description of FIG. 10 (FIG. 11)

In FIG. 11, the incoming multiplex highway terminal equipment 11 comprises a detecting or signal separator device 111 for extracting the NRZ data Di, the sampling clock pulses Hi, and the frame synchronization signal Si from the compound signal. The $TSE_i$ makes use, for example, of the Manchester II encoding principle with a slow clock in the absence of data as described in "A packet-switching local network for looped videocommunications: AMBRE project, paragraph 3.2, J-P COUDREUSE IDATA 81".

A sequencing generator 112 reset to zero by frame synchronization signals Si delivers the necessary pulses to units 12 and 13.

During the time between two consecutive resets of sequencing generator 112, the numbers with no particular punctuation are single action time; the numbers in square brackets indicate a period of included time limits and the numbers in brackets represent congruent pulses modulo 32; e.g., $(\beta)$: all times $\beta + 32$ k (integer k).

The control store 12 is made up of memory units proper 121, i.e., 4 circuits: $256 \times 4$ type 100422, parallel-mounted, a 24-bit shift register 122 with series and parallel loading and parallel reading whereby the writing orders from the marker can be received and the information to be returned after reading has been performed. This register 122 contains 8 address bits, 1 access type bit—reading and writing—and 15 bits of read data or data to be written.

The links M with the marker can be broken down as follows:
one link $M_c$ for series loading the register 122;
one link $M_l$ for series reading the register 122;
one clock line $M_h$ for shift, read or write of the register 122;
one link $M_s$ for exchange synchronization.

The circuit unit 13 comprises an 8-bit series-to-parallel conversion register 131 that receives the data Di at the rhythm Hi. The incoming data are then recorded as 8-bit words at times (25) and (33) in the registers 135 and 136 and, via the multiplexer 132, in the registers 133 and 134 at times (9) and (17) (FIG. 9).

Additionally, at the start of frame reception, the label j is recorded in a register 137 at time (9) and presented via the multiplexer 124 as an address to the memory unit 121.

Since the memory unit 121 is based on ECL technology, the internal label D, x, y is available approximately 14 μs after appearance of j, i.e., at time (14).

At times (31) and (33), the label D, x, y is loaded in the registers 133 and 134 via the multiplexers 138 and 132. At all times (33) with all the 32-bit registers 133 to 136 ready, a signal $R_i$ for presentation in the queue is generated.

To satisfy flow constraints, the queue 14 is obtained using RAM ECL memory 141 comprising 256 32-bit words (i.e., 8 ECL circuits $256 \times 4$ type 100422) controlled by control circuitry 142 that generates the addresses and the read or write signal.

An input register 143 and two output registers 144 and 145 of 32 bits each perform the temporary memorizing required to synchronize the memory access, in terms of asynchronous queue input and output $R_i$ and $R_o$ requests.

The access circuit to bus 15 includes a sequencer 151, that receives the signal UB from the queue control circuit 142 when a complete packet, stored in the queue, is ready for transmission without interrupting the bus rhythm.

Upon signal UB reception, the sequencer 151 sends a DAL bus allocation request to the allocator.

Once this request has been satisfied, the allocator sends the signal CAL to the selected requesting $TSE_i$.

At the rhythm of the base clock HAL received continuously by all the $TSE_i$, the sequencer then commences the transmission phase over the bus.

By means of signal $R_o$, the word in the register 145, i.e., the word at the bottom of the stack, is memorized in the output register 152 during which time a new output request is sent to the control circuit 142.

This word is then demultiplexed into 4 octets in the register 153 via the demultiplexer 154 and transmitted along the bus at the Hb rhythm derived from HAL.

When all the words in the packet have been transmitted, the end-of-packet information (signal Fb) is transmitted along the bus.

The gates 155, 156 and 157 are enabled during the transmission phase. After the transmission is over, gates 155, 156 and 157 make it possible to introduce the logic zero in the bus as required for the logic OR, the underlying principle of the bus, to function correctly.

II.3 Output Terminal Switching Equipment ($TSE_o$)

II.31 Functional Organization

Output equipment $TSE_{oq}$ recognizes from the words transmitted on the bus those words which are designated only for $TSE_{oq}$ for the point-to-point communications, when x=q. Equipment $TSE_{oq}$ also detects the transmitted words which are to be received by $TSE_{oq}$ and at least one other output equipment $TSE_o$, i.e., equipment $TSE_{oq}$ responds to those words for which it knows the code α. Equipment $TSE_{oq}$ then retransmits frames of label qk along the asynchronous series multiplex highway bearing number q.

The $TSE_{oq}$ includes (FIG. 12):
(a) a receiver unit 21 that performs label discrimination and generates the subsequent sequencing;
(b) a control store 22 of 526 8-bit words for the α→k conversion, complete with a marker access device;
(c) a multiplex 23 that sends the data to the stack;
(d) a stack 24 that, by stocking 32-bit words, has two roles:
(1) bit-rate change between the bus and the outgoing multiplex highways, namely:

receiving frames complete with outgoing labels k, at a rhythm $X_i$ compatible with the frame transfer along the bus, and feeding these frames toward $MUX_o$ at the rhythm $X_o$ from the multiplex base clock; and (2) queuing a series of possible packets, received virtually instantaneously from the $TSE_is$, i.e., possibly with no interruption at the bus rhythm $X_i$;

(e) a transmitter unit 25 that performs the parallel-to-series conversion and transmits frames under the instigation of the outgoing multiplex clock $H_o$; and (f) an outgoing multiplex terminal equipment 26 whereby a composite signal generated on $MUX_o$ comprises the outgoing data $D_o$, the clock pulses $H_o$ and the frame synchronization signal $T_o$.

Figure 13:
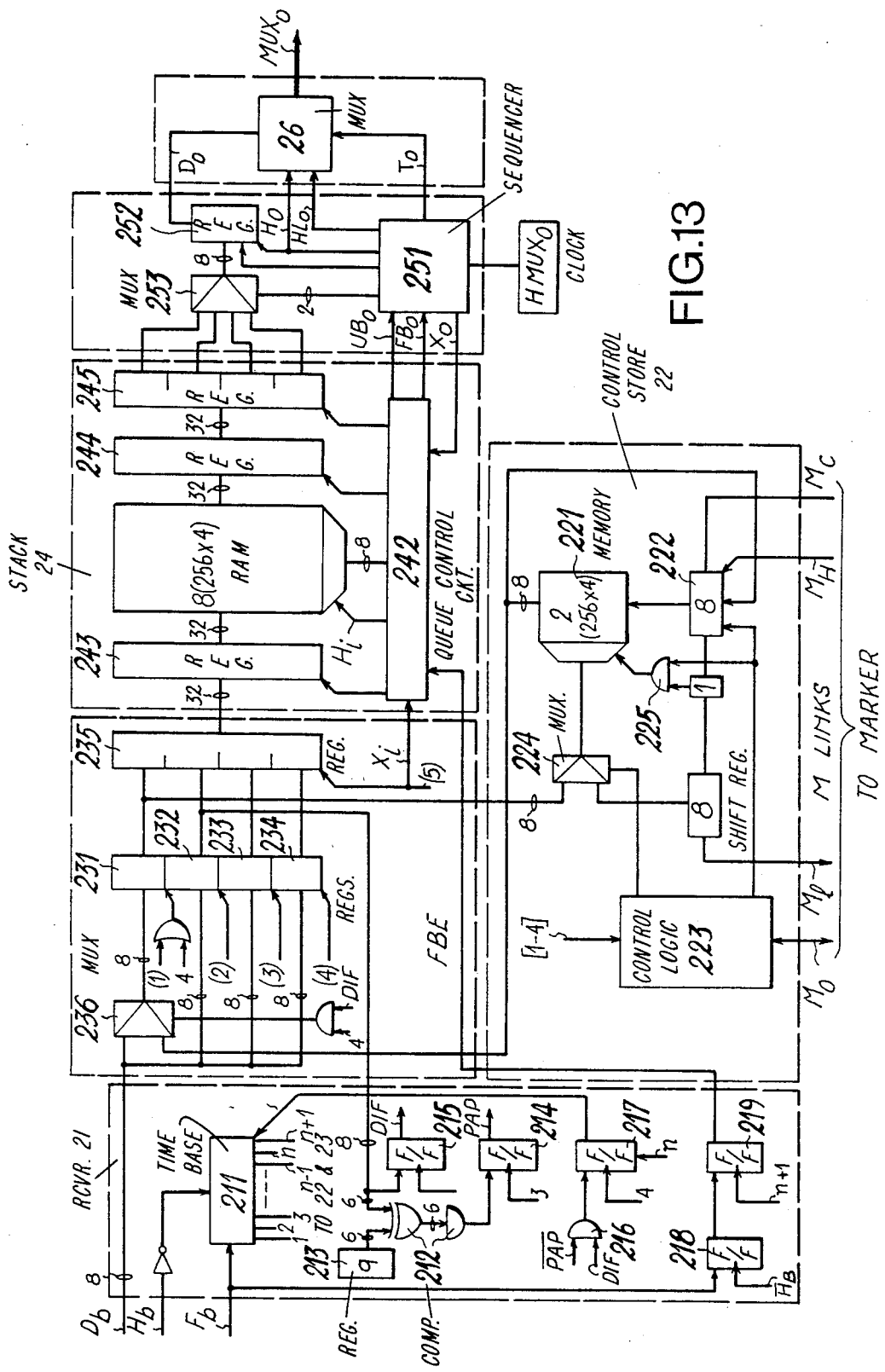
FIG. 13 is a block diagram of the entire outgoing terminal switching equipment $TSE_o$ structure.

II.32 Detailed Description of FIG. 12 (FIG. 13)

(a) In FIG. 13, a receiver unit 21 comprises a time base 211 that, by counting $\overline{H}_B$, synchronized with $F_B$, delivers the necessary time references to the units 22 and 23.

The times are given in brackets as congruent modulo 4.

The D, x part of the identification number is recorded at time 1 in the register 231 and the parameter x is then compared in the comparator 212 against the $TSE_o$ number q contained in the register 213.

At time 3:
if this comparison is positive, the flip-flop 214 delivers the point-to-point communication characterizing signal PAP;

if the parameter D so indicates, the flip-flop 215 delivers the signal DIF characteristic of a diffused communication.

Should neither one of these conditions be satisfied, then $TSE_{oq}$ is not concerned with the frame being transmitted on the bus and via the gate 216, whereby the flip-flop 217 at time 4 generates a signal blocking the time base generator 211 and hence the reception mechanism.

Flip-flops 218 and 219 make it possible to phase the end-of-packet signal transmitted along the bus in order to resynchronize the stack.

(b) control store 22 is composed of:
actual memory circuits 221, i.e., 2 circuits 256×4 type 100122, parallel-mounted;

a 17-bit shift register 222 with series and parallel loading and parallel reading for dialog with the marker via the links M (register 222 contains 8 address bits, 1 access bit and 8 data bits);

a control logic 223 that during the α→k conversion phase [1-4], synchronizes marker accesses by activating the multiplexer 224 and controlling the register 222 and the gate 225.

(c) the unit 23 consists of 4 registers 231 to 234 loaded respectively at times (1) to (4) to change the octet format on the bus to the 32-bit format in the stack.

When these registers 231 to 234 have been loaded, the contents thereof are transferred at time (5) to the register 235 to be introduced at rate $X_i$ in the stack 24.

By means of multiplexer 236, the address k of a diffuse communication having code α introduced as an address in the control store 221 18 nanoseconds earlier, is entered into the register 231.

(d) the stack 24 is obtained with the help of a RAM ECL memory 241 with a capacity of 256 32-bit words (i.e., 8 circuits 256×4 type 100422) controlled by management circuitry 241.

The registers 243, 244 and 245 carry out the memorization operations required for the asynchronous accesses as ordered by signals $X_i$ and $X_o$.

(e) the transmitter 25 fulfills the following role:

Once a packet is ready to leave, the queue control circuit 242 generates the signal UBS.

Under the instigation of the sequencer 251 governed by the outgoing multiplex base clock $HMUX_o$, the words constituting the packet are multiplexed into octets in the register 252 via the multiplexer 253 and then derived in series ($D_o$) at the rhythm $H_o$.

Resynchronized by end-of-outgoing-packet signal (FBS), the sequencer 251 produces frame synchronization $T_a$ for the intention of the outgoing multiplex terminal equipment.

What we claim is:

1. Asynchronous time division multiplex switching network for switching multi-service communication data, said network being intended to perform point-to-point data switching, data switching between a single calling party and a plurality of called parties and data switching between a plurality of calling parties and a single called party, said network comprising:

a plurality of incoming time division multiplex highways including asynchronous channels each formed by a packet of data and an address label (j) and a plurality of outgoing time division multiplex highways including asynchronous channels each formed by a packet of data and an address label (k);

incoming and outgoing terminal switching equipments respectively connected to said incoming and outgoing multiplex highways;

a bus interconnecting said incoming and outgoing terminal switching equipments;

means for converting the label (j) of an incoming asynchronous channel into an identification word which is decoded in the outgoing terminal switching equipments and is composed of three sub-words, the first sub-word being a sub-word characterizing the switching as being selected from
(a) point-to-point communication switching;
(b) communication switching from one called party to several called parties; and
(c) communication switching from several calling parties to one called party;

the second sub-word selectively designating the number of an outgoing multiplex highway or not having any significance with regard to the selected type of communication switching, and the third sub-word being a sub-word characterizing the number (k) of an outgoing asynchronous channel or the numbers (α) of several outgoing asynchronous channels in the case of one calling party to several called parties communication switching; and means for controlling the acceptation of the packets by the outgoing terminal switching equipments in response to the values of the three sub-words.

2. Asynchronous time division multiplex switching network for switching multi-service communication data, said network being intended to perform point-to-point data switching, data switching between a single calling party and a plurality of called parties and data switching between a plurality of calling parties and a single called party, said network coupling a plurality of incoming time division multiplex highways including asynchronous channels each formed by a packet of data and an address label (j) to a plurality of outgoing time division multiplex highways including asynchronous channels each formed by a packet of data and an address label (k), said network comprising:

incoming and outgoing terminal switching equipments respectively adapted to be connected to said incoming and outgoing multiplex highways;

a bus interconnecting said incoming and outgoing terminal switching equipments;

means for converting the label (j) of an incoming asynchronous channel into an identification word which is decoded in the outgoing terminal switching equipments and is composed of three sub-words, the first sub-word being a sub-word characterizing the switching as being selected from (a) point-to-point communication switching;

(b) communication switching from one called party to several called parties; and (c) communication switching from several calling parties to one called party;

the second sub-word selectively designating the number of an outgoing multiplex highway or not having any significance with regard to the selected type of communication switching, and the third sub-word being a sub-word characterizing the number (k) of an outgoing asynchronous channel or the numbers ($a$) of several outgoing asynchronous channels in the case of one calling party to several called parties communication switching; and means for controlling the acceptation of the packets by the outgoing terminal switching equipments in response to the values of the three sub-words.

* * * * *